United States Patent
Cociglio

(10) Patent No.: US 12,212,501 B2
(45) Date of Patent: Jan. 28, 2025

(54) ROUND-TRIP TIME MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 18/264,603

(22) PCT Filed: Feb. 15, 2022

(86) PCT No.: PCT/EP2022/053566
§ 371 (c)(1),
(2) Date: Aug. 8, 2023

(87) PCT Pub. No.: WO2022/175214
PCT Pub. Date: Aug. 25, 2022

(65) Prior Publication Data
US 2024/0121200 A1 Apr. 11, 2024

(30) Foreign Application Priority Data
Feb. 18, 2021 (IT) .......... 102021000003707

(51) Int. Cl.
*H04L 47/283* (2022.01)
*H04L 43/067* (2022.01)
*H04L 43/0864* (2022.01)

(52) U.S. Cl.
CPC .......... *H04L 47/283* (2013.01); *H04L 43/067* (2013.01); *H04L 43/0864* (2013.01)

(58) Field of Classification Search
CPC .. H04L 47/283; H04L 43/067; H04L 43/0864
See application file for complete search history.

(56) References Cited

U.S. PATENT DOCUMENTS

2021/0218687 A1* 7/2021 Tinnakornsrisuphap ................... H04L 47/12
2023/0403221 A1* 12/2023 Cociglio ............. H04L 43/0858

FOREIGN PATENT DOCUMENTS

FR    3 086 823 A1   4/2020
WO    WO-2019206862 A1 * 10/2019 ........... H04L 43/022
(Continued)

OTHER PUBLICATIONS

International Search Report issued Apr. 11, 2022 in PCT/EP2022/053566 filed on Feb. 15, 2022 4 pages.
(Continued)

*Primary Examiner* — Philip C Lee
(74) *Attorney, Agent, or Firm* — Oblon, McClelland, Maier & Neustadt, L.L.P.

(57) ABSTRACT

A method for transmitting a bidirectional packet flow between two nodes of a communication network. One of the nodes transmits to the other node one initial single marked packet of the bidirectional packet flow. Each one of the nodes transmits to the other node unmarked packets, until one single marked packet is received from the other node. In response thereto, each node transmits to the other node one single marked packet of the bidirectional packet flow. This mechanism is continuously performed by the nodes, thereby causing the nodes to cyclically exchange single marked packets of the bidirectional packet flow. A measurement point placed on the path of the bidirectional packet flow may then detect the single marked packets transmitted in a certain direction and provide RTT measurements based on differences between their detection times.

10 Claims, 6 Drawing Sheets

(56) References Cited

FOREIGN PATENT DOCUMENTS

| WO | WO-2020156996 A1 | * | 8/2020 | ............ H04L 43/026 |
| WO | WO-2020260571 A1 | * | 12/2020 | ......... H04L 43/0841 |
| WO | WO-2021105355 A1 | * | 6/2021 | ............. H04L 1/203 |
| WO | WO-2021180341 A1 | * | 9/2021 | |

OTHER PUBLICATIONS

Trammell, B. et al. "The Addition of a Spin Bit to the QUIC Transport Protocol draft-trammell-quic-spin-01" 2017. (22 pages).

De Vaere, P. et al. "Three Bits Suffice: Explicit Support for Passive Measurement of Internet Latency in QUIC and TCP", IMC '18, 2018. (7 pages).

Bulgarella, F. et al. "Performance Measurements of QUIC Communications", ANRW '19, 2019. (7 pages).

* cited by examiner

ROUND-TRIP TIME MEASUREMENT IN A PACKET-SWITCHED COMMUNICATION NETWORK

TECHNICAL FIELD

The present invention relates to the field of communication networks. In particular, the present invention relates to a round-trip time (RTT) measurement on a bidirectional packet flow carrying live traffic through a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Each packet is transmitted at a transmission time by the source node and is received at a reception time by the destination node. The time lapsing between transmission time and reception time is typically called "one-way delay". The one-way delay of a packet mainly depends on the number of possible intermediate nodes crossed by the packet from source to destination, the processing time of the packet by each node and the propagation time along the links.

Techniques are known which provide RTT (round-trip time) measurements, instead of one-way delay measurements. The RTT is the time lapsing between transmission time of a packet and reception time of an acknowledge packet transmitted in the opposite direction. RTT measurements are helpful especially because they do not require mutual synchronization of the local clocks at the various network nodes.

While some RTT measurement techniques (e.g. Ping) make use of artificial packets expressly generated for measurement purpose, some other RTT measurement techniques are performed on live traffic, namely on packets not generated for the purpose of performing the measurement.

As known, QUIC (Quick UDP Internet Connections) is a transport layer (layer 4) network protocol designed to support multiplexed connections between two endpoints over User Datagram Protocol (UDP).

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on two counter-propagating packet flows exchanged between two endpoints of a QUIC connection. According to the Internet draft, both the endpoints (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

The Applicant has noticed that the RTT measurement disclosed by the above Internet draft by B. Trammel et al. disadvantageously exhibits some drawbacks.

In particular, reception sequence errors or packet loss which might involve the packets at the edge of the spin bit signal disadvantageously impair the accuracy of the measurement results.

Assuming indeed that the client transmits a number of packets with spin bit equal to 0 followed by a number of packets with spin bit equal to 1, a reception sequence error causing one or more of the packets with spin bit equal to 0 being received by the measurement point after one or more of the packets with spin bit equal to 1 may cause the measurement point to detect one or more false edges of the spin bit signal, thereby providing an erroneous RTT measurement.

On the other hand, if a reception sequence error involves the first packet with spin bit equal to 1 and one or more of the subsequent packets having also their spin bit equal to 1, the RTT measurement is also inaccurate, because is not based on the detection times of a same packet (namely, the first packet transmitted after switching of the spin bit value from 0 to 1). The same occurs if the first packet with spin bit equal to 1 is lost.

In view of the above, the Applicant has tackled the problem of providing a method for transmitting a bidirectional packet flow carrying live traffic exchanged between two nodes of a packet-switched communication network, which enables more accurate RTT measurements on the packet flow.

In the following description and in the claims, the expression "enabling an RTT measurement" will designate an operation of marking and/or conditioning the packets of the bidirectional packet flow to be measured in such a way that an RTT measurement can be made by a measurement point placed on the path of the packet flow, either at an intermediate position of the path or at an endpoint of the path.

According to embodiments of the present invention, the above problem is solved by a method wherein each packet of the bidirectional packet flow carrying live traffic between the two nodes comprises a marking field settable to any of one or more first marking values (also termed herein below "measurement marking value(s)") and one or more second marking values (also termed herein below "idle marking value(s)"). One of the nodes initially transmits to the other node one initial marked packet, namely one packet of the bidirectional packet flow having its marking field set equal to a measurement marking value. Each node transmits to the other node the respective outgoing packets unmarked, namely with their marking field set equal to an idle value, until it receives the a marked packet from the other node. In response thereto, each node transmits to the other node one further marked packet, namely a further packet of the bidirectional packet flow having its marking field set equal to a measurement marking value. This is performed continuously by the two nodes, which accordingly cyclically exchange marked packets of the bidirectional packet flow.

This cyclic exchange of marked packets of the bidirectional packet flow advantageously enables an accurate RTT measurement.

Assuming that, before the measurement session, both the nodes transmits their outgoing packets unmarked (namely with their marking field set equal to an idle marking value, e.g. 0), a first node (for example the node acting as client of a QUIC connection) starts an RTT measurement session by transmitting one outgoing packet marked (namely, with its marking field set equal to a measurement marking value, e.g. 1). As the second node (for example the node acting as server of a QUIC connection) receives such initial marked packet from the first node, in response thereto it transmits one further marked packet to the first node. As the first node receives such further marked packet from the second node, in response thereto it transmits a still further marked packet to the second node. And so on.

A measurement point placed on the path of the bidirectional packet flow (namely, at an intermediate position or at any of the two nodes) may then perform an RTT measurement by detecting, in the packets transmitted e.g. from the first node to the second node, a couple of consecutive marked packets as transmitted by the first node and providing the RTT measurement as the time lapsing between the detection times of such marked packets.

Since identification of the marked packets by the measurement point is based on their marking value (which is other then the idle marking value applied to all the other packets unmarked of the bidirectional packet flow), the measurement point may correctly identify the marked packets, even if they are subjected to reception sequence errors that change their position within the flow of packets transmitted from the first node to the second node.

The resulting RTT measurement is therefore accurate, even in case of reception sequence errors involving the packets of the bidirectional packet flow transmitted from the first node to the second node.

According to a first aspect, the present invention provides a method for transmitting a bidirectional packet flow between a first node and a second node of a packet-switched communication network, the method comprising:
  a) by the first node, transmitting to the second node one initial single marked packet of the bidirectional packet flow; and
  b) by each one of the first node and the second node, transmitting to the other node unmarked packets of the bidirectional packet flow until one single marked packet of the bidirectional packet flow is received from the other node and, in response thereto, transmitting to the other node one further single marked packet of the bidirectional packet flow,
  wherein step b) is continuously performed by each one of the first node and the second node, thereby causing the first node and the second node to cyclically exchange further single marked packets of the bidirectional packet flow.

Preferably, each packet of the bidirectional packet flow comprises a marking field settable to either at least one idle marking value or at least one measurement marking value.

Preferably, in each unmarked packet of the bidirectional packet flow the marking field is set equal to the at least one idle marking value and in each single marked packet of the bidirectional packet flow the marking field is set equal to the at least one measurement marking value.

According to an embodiment, the first node at step b) forces transmission of the one further single marked packet of the bidirectional packet flow to the second node when a maximum time Tmax has lapsed since a previous transmission of one previous single marked packet of the bidirectional packet flow to the second node.

Preferably, the maximum time Tmax is counted by a local timer which the first node starts upon the previous transmission, the first node at step b) forcing the transmission upon expiry of the local timer.

Preferably, the maximum time Tmax is higher than a maximum round-trip time between the first node and the second node.

Preferably, the maximum time Tmax is calculated as a function of a previously measured round-trip time between the first node and the second node.

Preferably, at least one of the first node and the second node at step b) transmits to the other node the one further single marked packet of the bidirectional packet flow only if a time lapsing between reception of the one single marked packet of the bidirectional packet flow from the other node and transmission of the one further single marked packet of the bidirectional packet flow to the other node does not exceed a respective predefined threshold.

Preferably, at at least one of the first node and the second node the time running against the respective predefined threshold is counted by a further local timer which the at least one of the first node and the second node starts at step b) upon the reception.

According to a variant, at least one of the first node and the second node dynamically varies the respective predefined threshold.

According to a second aspect, the present invention provides a method for performing a round-trip time measurement on a bidirectional packet flow transmitted between a first node and a second node of a packet-switched communication network, the method comprising the steps of the method as set forth above and:
  c) by a measurement point placed on a path of the bidirectional packet flow, detecting two consecutive single marked packets of the bidirectional packet flow transmitted in a same direction between the first node and the second node and providing a round-trip time measurement between the first node and the second node as a time lapsing between detection of the two consecutive single marked packets of the bidirectional packet flow.

Preferably, step c) comprises discarding the round-trip time measurement if it is determined that the round-trip time measurement is not lower than a maximum time Tmax.

According to another aspect, the present invention provides a node for a packet-switched communication network, the node being configured to exchange a bidirectional packet flow with another node of the packet-switched communication network, the node being configured to:
  a) transmit to the other node one initial single marked packet of the bidirectional packet flow; and
  b) transmit to the other node unmarked packets of the bidirectional packet flow until one single marked packet of the bidirectional packet flow is received from the other node and, in response thereto, transmit to the other node one further single marked packet of the bidirectional packet flow,
  wherein the node is configured to perform step b) continuously, thereby cyclically exchanging with the second node further single marked packets of the bidirectional packet flow.

Preferably, the node is further configured to force transmission of the one further single marked packet of the bidirectional packet flow to the other node when a maximum time Tmax has lapsed since a previous transmission of one previous single marked packet of the bidirectional packet flow to the other node.

According to another aspect, the present invention provides a packet-switched communication network comprising a first node and a second node exchanging a bidirectional packet flow, wherein:

a) the first node is configured to transmit to the second node one initial single marked packet of the bidirectional packet flow; and b) each one of the first node and the second node is configured to transmit to the other node unmarked packets of the bidirectional packet flow until one single marked packet of the bidirectional packet flow is received from the other node and, in response thereto, transmit to the other node one further single marked packet of the bidirectional packet flow, wherein each one of the first node and the second node is configured to continuously perform step b), thereby causing the first node and the second node to cyclically exchange further single marked packets of the bidirectional packet flow.

Preferably, the packet-switched communication network further comprises:

c) a measurement point placed on a path of the bidirectional packet flow, the measurement point being configured to detect two consecutive single marked packets of the bidirectional packet flow transmitted in a same direction between the first node and the second node and to provide a round-trip time measurement between the first node and the second node as a time lapsing between detection of the two consecutive single marked packets of the bidirectional packet flow.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
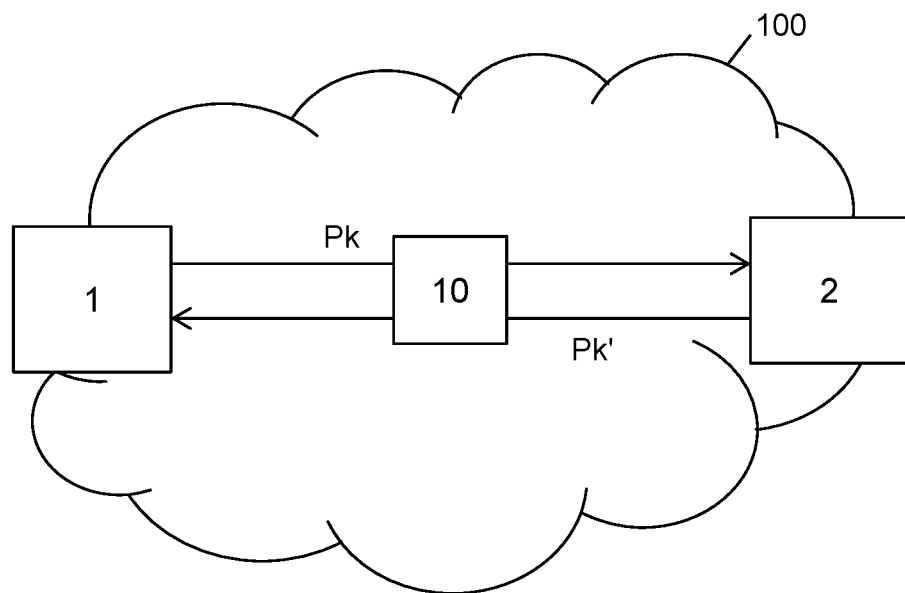
FIG. 1 schematically shows a packet-switched communication network in which the method for performing performance measurements according to embodiments of the present invention is implemented.

FIG. 1 schematically shows a packet-switched communication network 100 configured to perform an RTT measurement according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The nodes 1, 2 exchange a bidirectional packet flow including packets Pk transmitted from the node 1 to the node 2 and packets Pk' transmitted from the node 2 to the node 1, as schematically depicted in FIG. 1. The packets Pk, Pk' carry live traffic, namely they are not generated for the purpose of the one-way delay measurement. The packets Pk may belong to a same packet flow (namely, they may all have a same source address and a same destination address, e.g. a same IP source address and a same IP destination address) or to different packet flows whose paths are overlapping between the nodes 1 and 2. Similarly, the packets Pk' may belong to a same packet flow or to different packet flows whose paths are overlapping between the nodes 2 and 1.

The packets Pk, Pk' are formatted according to a certain network protocol. By way of non limiting example, the network protocol may be the above mentioned QUIC protocol.

Figure 2:
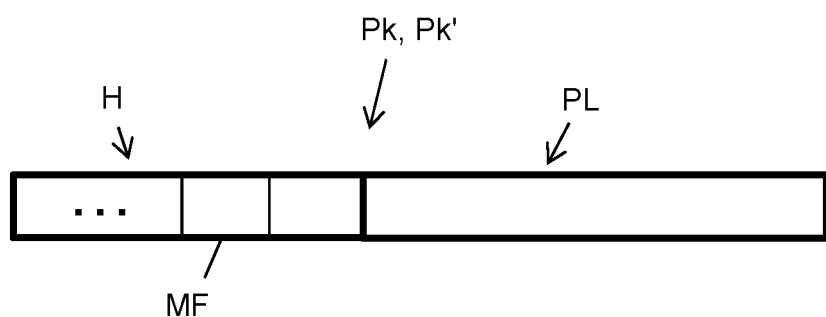
FIG. 2 schematically shows the structure of a packet exchanged in the communication network of FIG. 1, according to embodiments of the present invention.

In particular, as schematically depicted in FIG. 2, each packet Pk, Pk' comprises a payload PL comprising user data and at least one header H. In case of multiple headers, each header pertains to a different network layer. For example, each packet Pk, Pk' may comprise a network layer header (such as an IP header) and transport layer header (such as a QUIC+UDP header or a TCP header). One of the headers H (typically, the network layer header) comprises packet forwarding information, namely information allowing the packets Pk to reach the network node 2 and the packets Pk' to reach the node 1.

Each packet Pk, Pk' also preferably comprises at least one measurement dedicated field MF (also termed herein after "marking field") supporting a RTT measurement on the bidirectional packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header. The marking field MF comprises one or more bits, preferably a single bit. The marking field MF may be set to anyone of two alternative marking values (e.g. 0 and 1). By way of non-limiting example, if the packets Pk, Pk' are formatted according to the QUIC protocol, the marking field MF may be the spin bit field comprised in the QUIC header as disclosed in the above Internet draft of B. Trammel et al.

Each node 1, 2 sets the value of the marking field MF in its respective outgoing packets Pk, Pk', before transmitting them to the other node 2, 1, so as to enable an RTT measurement between the nodes 1, 2. When no RTT measurement is performed, both the nodes 1, 2 preferably transmit the respective outgoing packets Pk, Pk' unmarked, namely with their marking field MF set to a marking value M0 (also termed "idle marking value"), e.g. 0.

With reference now to the flow charts of FIGS. 3 and 4, the operation of the nodes 1, 2 will be described in further detail. If the nodes 1, 2 are the endpoints of a QUIC connection, the node 1 may be the one acting as client of the QUIC connection, while the node 2 may be the one acting as server of the QUIC connection.

Figure 3:
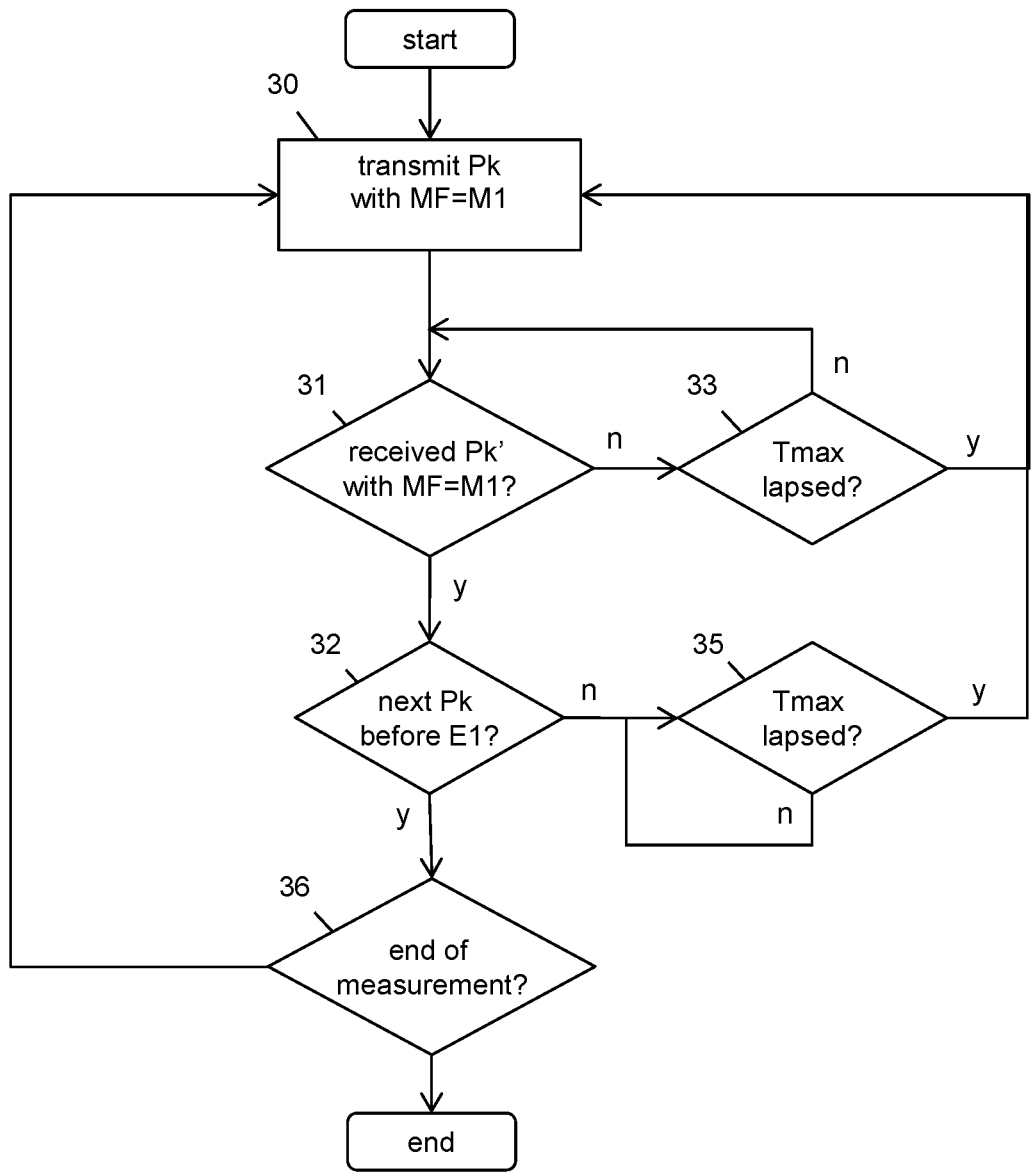
FIG. 3 is a flow chart of the operation of a first node of the communication network of FIG. 1, according to an embodiment of the present invention.

With reference first to the flow chart of FIG. 3, the node 1 preferably starts an RTT measurement session by transmitting to the node 2 a single marked packet Pkm, namely a packet Pk of the bidirectional packet flow with its marking field MF set equal to a marking value M1 other than the idle marking value M0 (step 30). In the present description and in the claims, such latter marking value M1 is also termed "measurement marking value". For example, if the idle marking value M0 is equal to 0, the measurement marking value M1 applied by the node 1 to the marked packet Pkm may be equal to 1.

The node 1 also continuously receives from the node 2 packets Pk' with their marking fields MF set to a marking value applied by the node 2 upon their transmission (the rules whereby the node 2 sets the marking field MF in its outgoing packet Pk' will be described herein below with reference to the flow chart of FIG. 4).

As long as the node 1 continues receiving from the node 2 unmarked packets Pk', namely packets Pk' with their marking field MF set equal to the idle marking value M0, it continues transmitting its outgoing packets Pk unmarked, namely with their marking field MF set equal to the idle marking value M0.

When instead the node 1 receives from the node 2 a single marked packet Pkm' (namely, a packet Pk' with its marking field MF set equal to the measurement marking value M1) (step 31), it preferably starts a timer counting a time threshold E1. The time threshold E1 may be equal e.g. to a 1 ms.

If a packet Pk shall be transmitted to the node 2 before lapse of the time threshold E1 (step 32), then the node 1 reverts to step 30 and transmits to the node 2 such packet Pk with its marking field MF set equal to the measurement marking value M1. Such packet is therefore a further single marked packet Pkm.

Otherwise, if no packet Pk shall be transmitted to the node 2 before the time threshold E1 expires (e.g. because the packet rate from the node 1 to the node 2 is temporarily too low), the node 1 preferably continues transmitting to the node 2 packets Pk unmarked, namely with their marking field MF set equal to the idle marking value M0.

According to an embodiment, each time the node 1 performs step 30 of transmitting to the node 2 a single marked packet Pkm, it also starts a further timer counting a maximum time Tmax.

The node 1 preferably waits for reception from the node 2 of a marked packet Pkm' (step 31) until Tmax has lapsed (step 33). If no marked packet Pk' is received before Tmax expires, then the node 1 reverts to step 30 and forces anyway transmission of a single marked packet Pkm to the node 2.

Further, if—following to reception of a single marked packet Pkm'—the time threshold E1 expires without any packet Pk to be transmitted to the node 2 (step 32), the node 1 waits until Tmax expires (step 35) and then reverts to step 30, thereby forcing anyway transmission of a single marked packet Pkm to the node 2.

Hence, according to this embodiment the node 1 basically performs an iteration of step 30 (namely, it transmits to the node 2 a single marked packet Pkm) at most every Tmax milliseconds, even when the packet rate in any of the two counterpropagating directions does not allow a proper and timely "reflection" on the measurement marking value M1 at any of the nodes 1, 2.

The above steps are iterated by the node 1, until the end of the measurement session (step 36).

Figure 4:
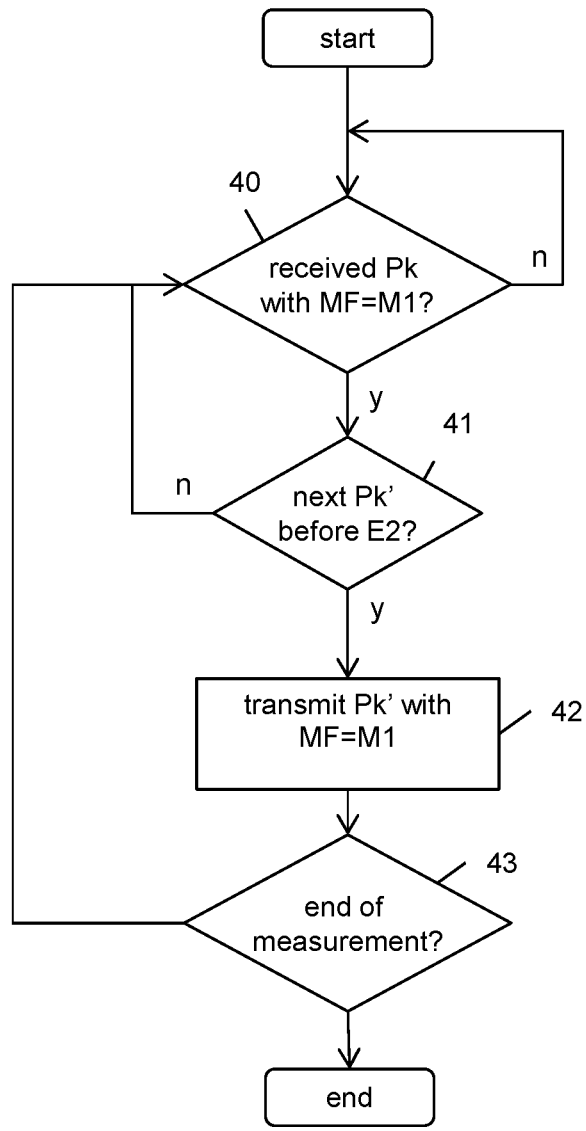
FIG. 4 is a flow chart of the operation of a second node of the communication network of FIG. 1, according to an embodiment of the present invention.

With reference now to the flow chart of FIG. 4, the node 2 continuously receives from the node 1 packets Pk with their marking field MF set to the marking value applied by the first node 1 according to the flow chart of FIG. 3.

As mentioned above, before a measurement session is started, the node 2 transmits its outgoing packets Pk' unmarked, namely with their marking field MF set equal to the idle marking value M0 (e.g. 0).

As long as the node 2 does not receive from the node 1 any marked packet Pkm (namely, any packet Pk with its marking field MF set equal to the measurement marking value M1) (step 40), it preferably continues transmitting packets Pk' unmarked, namely with their marking field MF set equal to the idle marking value M0.

When instead the node 2 receives from the node 1 a single marked packet Pkm, it preferably starts a timer counting a time threshold E2. If a packet Pk' shall be transmitted to the node 1 before lapse of the time threshold E2 (step 41), then the node 2 transmits this single packet Pk' with its marking field MF set equal to the measurement marking value M1. Such packet is therefore a further single marked packet Pkm'.

Otherwise, if no packet Pk' shall be transmitted to the node 1 before the time threshold E2 expires, the node 2 preferably continues transmitting to the node 1 packets Pk' unmarked, namely with their marking field MF set equal to the idle marking value M0.

The above steps are indefinitely iterated by the node 2, until the end of the measurement session (step 43).

The continuous iteration of the steps shown in the flow charts of FIGS. 3 and 4 by the nodes 1 and 2 then causes the nodes 1 and 2 to cyclically exchange single marked packets Pkm, Pkm' of the bidirectional packet flow which advantageously enable accurate RTT measurements between the nodes 1, 2, as it will be explained with reference to FIGS. 5a-5c.

Figure 5A:
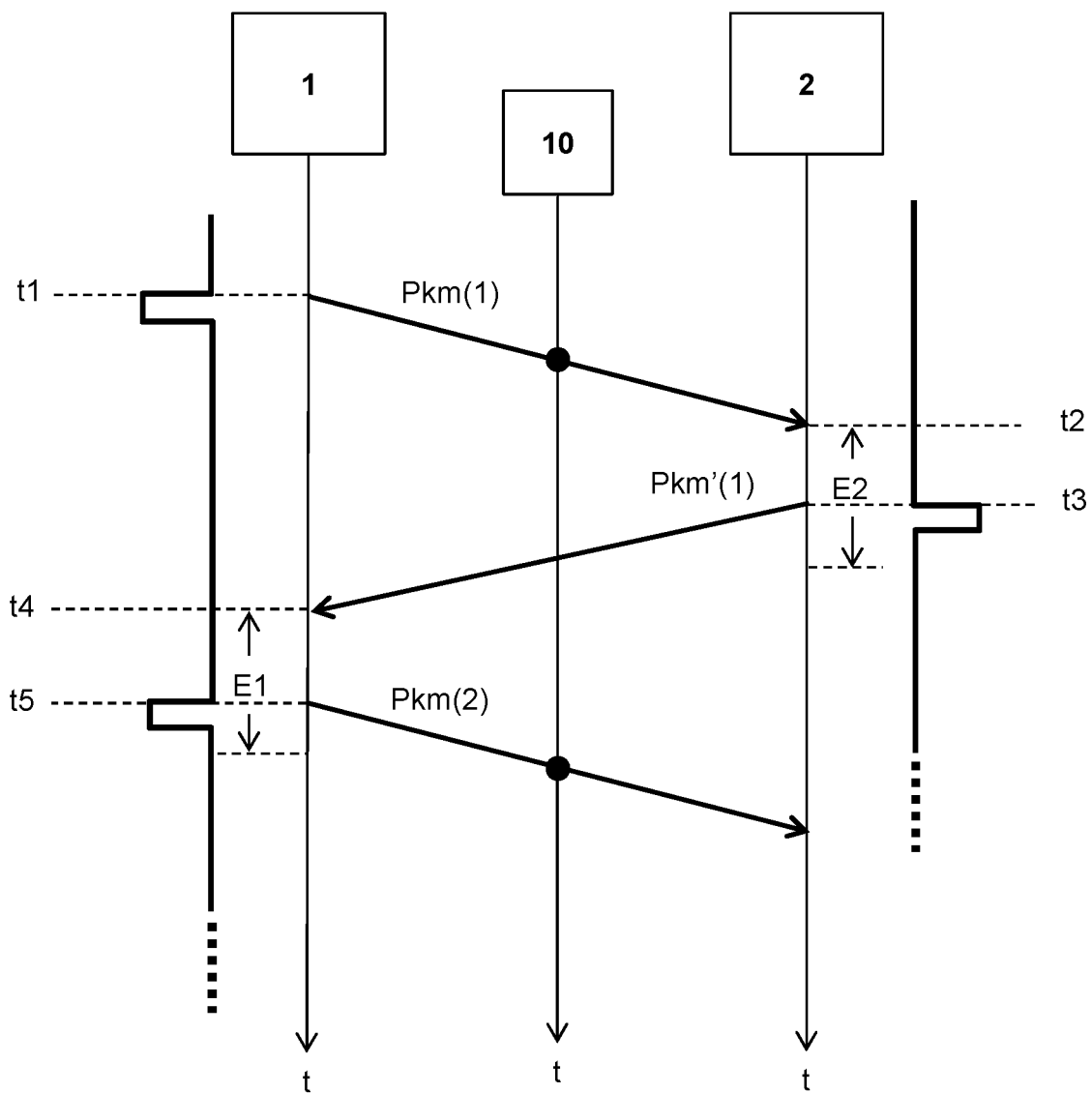
FIGS. 5a-5c show three exemplary scenarios which might occur at the first and second nodes of the communication network of FIG. 1.

With reference first to FIG. 5a, assuming that, before the measurement session, both the nodes 1, 2 transmit the respective outgoing packets Pk, Pk' unmarked (namely, with their marking field MF set equal to the idle marking value M0, e.g. 0), at time t1 the node 1 starts a measurement session by transmitting to the node 1 an initial single marked packet Pkm(1), namely a single packet Pk with its marking field MF set equal to the measurement marking value M1 (e.g. 1) (step 30).

As long as the node 2 receives packets Pk unmarked, namely with marking field MF equal to the idle marking value M0, it continues transmitting packets Pk' unmarked, namely with their marking field MF set equal to the idle marking value M0.

Then, at time t2, the node 2 receives the single marked packet Pkm(1) from the node 1 (step 40). The node 2 then waits for the next packet Pk' to be transmitted to the node 1 (step 41). In the scenario of FIG. 5a, it is assumed that the transmission time t3 of the next packet Pk' to be transmitted to the node 1 is delayed relative to t2 by less than the time threshold E2. Hence, at time t3 the node 2 transmits such packet Pk' with its marking filed MF set equal to the measurement marking value M1 (step 42), such packet Pk' thus becoming a further single marked packet Pkm'(1).

As long as the node 1 receives unmarked packets Pk', the node 1 preferably continues transmitting to the node 2 unmarked packets Pk.

Then, at time t4, the node 1 receives from the node 2 the marked packet Pkm'(1) (step 31). The node 1 then waits for the next packet Pk to be transmitted to the node 2 (step 32). In the scenario of FIG. 5a, it is assumed that the transmission time t5 of the next packet Pk to be transmitted to the node 1 is delayed relative to t4 by less than the time threshold E1. Hence, at time t5 the node 1 transmits such packet Pk with its marking filed MF set equal to the measurement marking value M1 (step 30), such packet Pk thus becoming a further single marked packet Pkm(2). And so on.

A measurement point 10 placed on the path of the bidirectional packet flow (namely, at an intermediate position or at any of the two nodes 1, 2) may then perform an RTT measurement by detecting, in the flow of packets Pk transmitted from the node 1 to the node 2, the single marked packets Pkm(1) and Pkm(2) as those packets Pk whose marking field MF is set equal to the measurement marking value M1. The measurement point 10 may then provide an RTT measurement as the time lapsing between the detection times of these two consecutive single marked packets Pkm(1) and Pkm(2). More generally, an RTT measurement may be provided for any couple of consecutive single marked packets which are exchanged by the nodes 1 and 2 following to the packets Pkm(1) and Pkm(2).

More specifically, as the measurement point 10 detects the first single marked packet Pkm(1) in the packets Pk, it preferably waits a predefined wait time W (with W<min (RTT)) before starting the search of the next single marked packet Pkm(2). Hence, only RTT higher than W may be measured by the measurement point 10.

It may be appreciated that, since identification of the single marked packets Pkm(1), Pkm(2) by the measurement point 10 is based on their marking value M1 (which is different from the marking value M0 of all the other unmarked packets Pk transmitted from the node 1 to the node 2), the measurement point 10 may correctly identify the single marked packets Pkm(1), Pkm(2), even if there are subjected to reception sequence errors that change their position within the flow of packets Pk transmitted from the node 1 to the node 2. The resulting RTT measurement is therefore accurate, even in case of reception sequence errors involving the packets Pk of the bidirectional packet flow transmitted from the node 1 to the node 2.

It may also be appreciated that this RTT measurement is affected by a predictable maximum error equal to E1+E2.

Figure 5B:
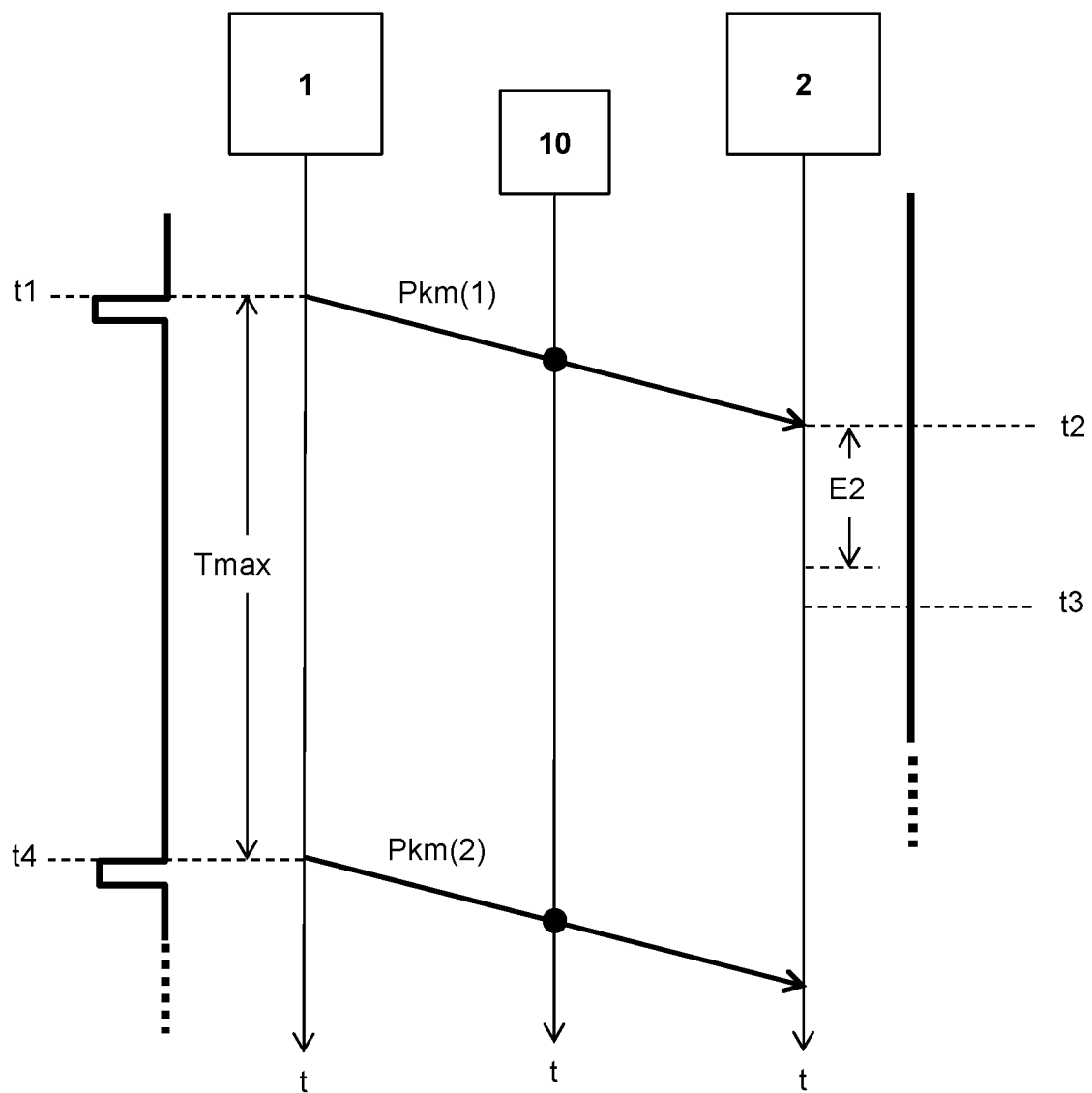

With reference now to FIG. 5b, the scenario depicted in this Figure differs from that of FIG. 5a in that it is assumed that, after the node 2 has received at time t2 the initial single marked packet Pkm(1) from the node 1, the transmission time t3 of the next packet Pk' to be transmitted to the node 1 is delayed relative to time t2 by more than the time threshold E2. Hence, at time t3 the node 2 does not transmit the single marked packet Pkm'(1) and continues instead transmitting the packets Pk' unmarked, namely with their marking field MF set equal to the idle marking value M0.

The node 1 then continues receiving packets Pk' unmarked and, accordingly, continues transmitting to the node 2 packets Pk also unmarked. Such transmission continues until time t4 (step 33), which is delayed by Tmax relative to the time t1 of the transmission of the last single marked packet, namely the initial single marked packet Pkm(1). Hence, at time t4 the node 1 forces the transmission of the further single marked packet Pkm(2) (step 30).

Figure 5C:
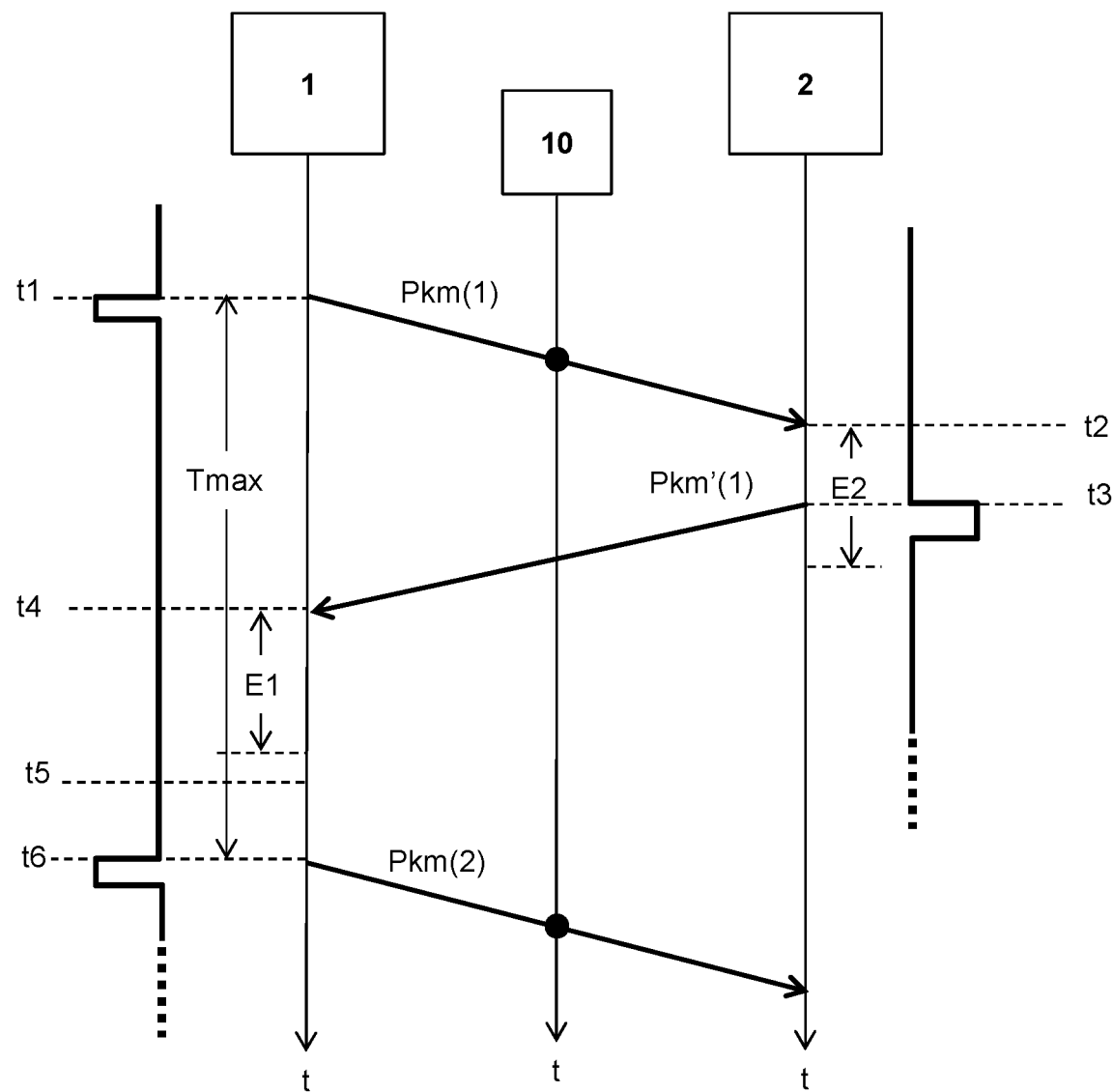

With reference now to FIG. 5c, the scenario depicted in this Figure differs from that of FIG. 5a in that, after the node 1 has received at time t4 the single marked packet Pkm'(1), the transmission time t5 of the next packet Pk to be transmitted to the node 1 is delayed relative to time t4 by more than the time threshold E1. Hence, at time t5 the node 1 does not transmit the single marked packet Pkm(2) and continues instead transmitting to the node 2 packets Pk unmarked. Such transmission preferably continues until time t6 (step 33), which is delayed by Tmax relative to the time t1 of the transmission of the last single marked packet, namely the initial single marked packet Pkm(1). Hence, at time t6 the node 1 forces the transmission of the further single marked packet Pkm(2) (step 30).

In the scenarios of FIGS. 5b and 5c, therefore, the time lapsing between transmission of the initial single marked packet Pkm(1) and the forced transmission of the subsequent single marked packet Pkm(2) is substantially equal to Tmax. Hence, if for example Tmax is selected much higher than the maximum RTT between the nodes (e.g. Tmax=1000 ms), the measurement point 10 may realize that the time lapsing between the detection times of the two consecutive single marked packets Pkm(1), Pkm(2) is too high, and hence does not provide a reliable (and hence valid) RTT measurement. For example, the measurement point 10 may consider an RTT measurement valid only if it is lower than Tmax (or, more preferably, lower than Tmax minus an error threshold, for example 10% Tmax). Otherwise, if the RTT measurement is not lower than Tmax (or, more preferably, not lower than Tmax minus an error threshold, for example 10% Tmax), then it is discarded.

Hence, advantageously, the method implemented by nodes 1, 2 according to embodiments of the present invention enables RTT measurements which provide reliable results. In particular, an RTT measurement is provided only for couples of consecutive single marked packets Pk(1), Pkm(2) for which it can be guaranteed that the unpredictable fluctuations of the packet rates in the two opposite directions introduce a maximum error of E1+E2 on the RTT measurement. When this can not be guaranteed, the measurement point 10 discards the RTT measurement.

As mentioned above, in order to allow the measurement point 10 to determine the RTT measurements to be discarded, Tmax shall be much higher than the maximum RTT between the nodes 1 and 2. For example, Tmax may be set a priori to a value which is certainly much higher than the maximum RTT between the nodes 1 and 2, for example 1000 ms.

Alternatively, Tmax may be calculated as a function of a previously measured RTT. Such previously measured RTT may be obtained by any known technique for measuring the RTT on a link between two nodes. If RTT* is the previously measured RTT, Tmax may be calculated as a function of RTT* by applying the following equation:

$$T\max = k \times RTT^* + Q, \quad [1]$$

where k and Q are empirically dimensioned variables. For example, the Applicant has obtained positive results by setting k=1.5 and Q=80 ms.

According to an advantageously variant, at least one of the nodes 1, 2 may dynamically vary the value of its time threshold E1, E2 during the measurement session. For example, one of the nodes 1, 2 may initially set its time threshold E1, E2 to a maximum initial value Emax (e.g. 1 ms). Then, each time the condition on the time threshold E1, E2 is met and the transmission of a single marked packet Pkm then properly operates, the node 1, 2 decreases the value of its time threshold E1, E2. The value of the time threshold E1, E2 may be decreased step-by-step from the maximum value Emax to a minimum value Emin. For this purpose, a number of predefined intermediate values comprised between Emin and Emax may be provided. Each time the condition on the threshold E1, E2 is met, the value of E1, E2 is decreased by one step until, either the minimum value Emin is reached, or the condition on the threshold E1, E2 is not met anymore. In the latter case, the node 1, 2 preferably increases the value of its time threshold E1, E2 by one step and keeps it fixed.

Hence, the nodes 1, 2 may apply time thresholds E1, E2 with different values, the value applied by each node 1, 2 basically depending on the packet rate in its outgoing direction. The higher and the more stable the packet rate in a direction, indeed, the lower the value of E1, E2 required to provide a proper operation of the reflection mechanism at the node transmitting packets in that direction, the lower the contribution of that direction to the maximum error affecting the RTT measurement.

Further, even though in the above description it has been assumed that Tmax is a predefined time counted by a timer which the node 1 restarts each time it transmits a single marked packet Pkm, this is not limiting. Alternatively, for example, a time Tmax' may be counted by the measurement point 10 since detection of the last marked packet Pkm, or since provision of the last valid RTT measurement. Upon expiry of Tmax', the measurement point 10 may generate an alert directly or indirectly inducing the node 1 to force transmission of a single marked packet Pkm. The forced transmission will then occur at a time Tmax>Tmax' since transmission the last single marked packet Pkm. In this case Tmax is variable, since it depends not only on Tmax', but also on subsequent alert generation and transmission mechanisms inducing an unpredictable delay between expiry of Tmax' and the actual transmission time of the single marked packet Pkm.

Though in the above description it has been assumed that the measurement point 10 is capable of detecting only packets Pk transmitted from node 1 to node 2, this is not limiting. The measurement point 10 may be capable of detecting packets Pk' transmitted in the opposite directions, in which case the RTT measurements are obtained based on the detection times of the single marked packets Pkm'.

If the measurement point 10 is capable of detecting both packets Pk and packets Pk', other time measurements can be made. The RTT measurements in the opposite directions may indeed be combined to provide half-way RTT measurements on both sides of the measurement point 10 (namely, from the measurement point 10 to a node 1, 2 and back).

Two or more measurement points may also be provided between the nodes 1 and 2. Their RTT measurements (end-to-end and half-way) may be combined to provide a further segmentation of the RTT measurements between the nodes 1 and 2.

Further, in the above detailed description it has been assumed that all the single marked packets Pkm, Pkm' comprise a same measurement marking value. This is however not limiting. According to other embodiments, the marking field MF may comprise two or more bits, thereby allowing to provide two or more different measurement marking values. In this case, each node 1, 2 may use a respective different measurement marking value for its respective single marked packets Pkm, Pkm'. Alternatively, each node 1, 2 may apply to its single marked packets Pkm, Pkm' two or more measurement marking values in an alternate or cyclic way. This allows the measurement point 10 to provide multiple measurement samples for each cycle, and to detect possible reception sequence errors or packet loss affecting the measurement packets.

The invention claimed is:

1. A method for performing a round-trip time measurement on a bidirectional packet flow transmitted between a first node and a second node of a packet-switched communication network, said method comprising:
   a) by said first node, transmitting to said second node one initial single marked packet of said bidirectional packet flow; and
   b) by each one of said first node and said second node, transmitting to the other node, of said first node and said second node, unmarked packets of said bidirectional packet flow until one marked packet of said bidirectional packet flow is received from the other node and, in response thereto, transmitting to the other node one further single marked packet of said bidirectional packet flow,
   wherein step b) is continuously performed by each one of said first node and said second node, thereby causing said first node and said second node to cyclically exchange further single marked packets of said bidirectional packet flow,
   wherein said first node at step b) forces transmission of said one further single marked packet of said bidirectional packet flow to the second node when a maximum time has lapsed since a previous transmission of one previous single marked packet of said bidirectional packet flow to said second node,
   said method further comprising:
   c) by a measurement point placed on a path of said bidirectional packet flow, detecting two consecutive single marked packets of said bidirectional packet flow transmitted in a same direction between said first node and said second node and providing a round-trip time measurement between said first node and said second node as a time lapsing between detection of said two consecutive single marked packets of said bidirectional packet flow, wherein said step c) comprises discarding said round-trip time measurement if it is determined that said round-trip time measurement is not lower than said maximum time.

2. The method according to claim 1, wherein each packet of said bidirectional packet flow comprises a marking field settable to either at least one idle marking value or at least one measurement marking value.

3. The method according to claim 2, wherein in each unmarked packet of said bidirectional packet flow said marking field is set equal to said at least one idle marking value and wherein in each single marked packet of said bidirectional packet flow said marking field is set equal to said at least one measurement marking value.

4. The method according to claim 1, wherein said maximum time is counted by a local timer which said first node starts upon said previous transmission, said first node at step b) forcing said transmission upon expiry of said local timer.

5. The method according to claim 1, wherein said maximum time is higher than a maximum round-trip time between said first node and said second node.

6. The method according to claim 1, wherein said maximum time is calculated as a function of a previously measured round-trip time between said first node and said second node.

7. The method according to claim 1, wherein at least one of said first node and said second node at step b) transmits to the other node said one further single marked packet of said bidirectional packet flow only if a time lapsing between reception of said one single marked packet of said bidirectional packet flow from the other node and transmission of said one further single marked packet of said bidirectional packet flow to said other node does not exceed a respective predefined threshold.

8. The method according to claim 7, wherein for at least one of said first node and said second node the time running against said respective predefined threshold is counted by a further local timer which said at least one of said first node and said second node starts at step b) upon said reception.

9. The method according to claim 7, wherein said at least one of said first node and said second node dynamically varies said respective predefined threshold.

10. A packet-switched communication network comprising a first node and a second node exchanging a bidirectional packet flow, wherein:
- a) said first node is configured to transmit to said second node one initial single marked packet of said bidirectional packet flow; and
- b) each one of said first node and said second node is configured to transmit to the other node, of said first node and said second node, unmarked packets of said bidirectional packet flow until one single marked packet of said bidirectional packet flow is received from the other node and, in response thereto, transmit to the other node one further single marked packet of said bidirectional packet flow, wherein each one of said first node and said second node is configured to continuously perform step b), thereby causing said first node and said second node to cyclically exchange further single marked packets of said bidirectional packet flow, wherein said first node at step b) forces transmission of said one further single marked packet of said bidirectional packet flow to the second node when a maximum time has lapsed since a previous transmission of one previous single marked packet of said bidirectional packet flow to said second node, the packet-switched communication network further comprising:
- c) a measurement point placed on a path of said bidirectional packet flow, said measurement point being configured to detect two consecutive single marked packets of said bidirectional packet flow transmitted in a same direction between said first node and said second node and to provide a round-trip time measurement between said first node and said second node as a time lapsing between detection of said two consecutive single marked packets of said bidirectional packet flow, said measurement point being configured to discard said round-trip time measurement if it is determined that said round-trip time measurement is not lower than said maximum time.

* * * * *